United States Patent [19]

Brueggmann

[11] Patent Number: 5,794,940
[45] Date of Patent: Aug. 18, 1998

[54] END FACE SEAL WITH SACRIFICIAL WEAR-IN EXCLUDER

[75] Inventor: Gerd Ludwig Brueggmann, Hickory Hills, Ill.

[73] Assignee: SKF USA Inc., Elgin, Ill.

[21] Appl. No.: 711,604

[22] Filed: Sep. 10, 1996

[51] Int. Cl.⁶ .................................................. F16J 15/32
[52] U.S. Cl. ........................... 277/92; 277/95; 277/85; 277/165
[58] Field of Search ............................ 277/95, 92, 38, 277/165, 85

[56] References Cited

U.S. PATENT DOCUMENTS

| | | | |
|---|---|---|---|
| 2,547,185 | 4/1951 | Von Bolhan | 277/95 |
| 3,241,843 | 3/1966 | Hatch et al. | 277/92 |
| 3,241,844 | 3/1966 | Morley | 277/92 |
| 3,511,512 | 5/1970 | Wheelock | 277/47 |
| 3,785,856 | 1/1974 | Gotoh | 117/75 |
| 4,094,516 | 6/1978 | Morley et al. | 277/92 |
| 4,256,315 | 3/1981 | Larson et al. | 277/92 |
| 4,331,339 | 5/1982 | Reinsma | 277/95 |
| 4,401,307 | 8/1983 | Dechavanne | 277/50 |
| 4,421,327 | 12/1983 | Morley et al. | 277/92 |
| 4,457,521 | 7/1984 | Morley | 277/92 |
| 4,819,952 | 4/1989 | Edlund | 277/165 |
| 4,848,776 | 7/1989 | Winckler | 277/23 |
| 4,866,827 | 9/1989 | Benfer et al. | 29/148.45 |
| 5,183,269 | 2/1993 | Black et al. | 277/37 |
| 5,336,047 | 8/1994 | Kolhouse | 415/168 |

OTHER PUBLICATIONS

Chicago Rawhide Manufacturing Company Brochure 5M982 No. 98342, "CR TRACKSTAR™ Grit Seals", pp. 1–4.

*Primary Examiner*—William A. Cuchlinski, Jr.
*Assistant Examiner*—Christina Annick
*Attorney, Agent, or Firm*—James T. FitzGibbon

[57] ABSTRACT

An end face seal especially adapted for use in severe service environments such as for sealing track pins or track rollers of crawler type tractors. The seal includes a primary annular seal ring, having a radially extending flange with a portion for contacting a mating surface on a machine part in face sealing engagement and an axially extending flange portion, as well as a secondary annular sealing ring positioned in use about the axial flange portion. The secondary seal ring includes an abradable auxiliary excluder lip that contacts a portion of the machine part with the mating surface so as to initially exclude grit from the seal band area of contact between the seal ring and the machine part.

12 Claims, 2 Drawing Sheets

END FACE SEAL WITH SACRIFICIAL WEAR-IN EXCLUDER

BACKGROUND OF THE INVENTION

The present invention relates generally to mechanical end face seals, and more particularly, to seals which are intended to exclude grit from a sealed region and to retain oil, grease or other fluid within that region.

As the name implies, a mechanical end face seal is a seal wherein a dynamic seal is formed where opposed end faces of two relatively rotatable elements meet, one element of which is relatively fixed and the other of which moves axially in use to the extent necessary to accommodate an anticipated range of motion caused by wear, dynamic runout, or other conditions characterizing the application. In an end face seal, the seal band basically lies in a radial plane, whereas the seal band of a lip or shaft seal forms a cylindrical pattern.

Many years ago, typical mechanical end face seals were those which required at least one separate element to perform each function, namely, primary sealing, secondary sealing, application of an end face load and torque transmission. Such seals had certain advantages, but many were far too complex mechanically to be used in mass production applications with reasonable hopes of reliability over an extended period in extremely heavy duty use. Subsequently, improved, greatly simplified end face seals were provided wherein the number of component parts was reduced and the functions able to be achieved by each part were multiplied. One very successful seal of this type is described and claimed in U.S. Pat. No. 3,241,843.

In such a seal, one (or two in the case of a bilateral seal) rubber ring element and one hard metal element for each rubber element served to create an end face seal. The rubber-to-metal interface was capable of providing torque transmission, secondary sealing and also applied and maintained an end face sealing load, while the primary seal was created between the end face of the metal element and an opposite, identical element (or another end face surface).

Such seals were commonly able to last for the entire life of the sealed mechanism and hence, were considered "lifetime" seals. The only drawback with such seals was high cost.

Subsequently, seals have been designed and manufactured that utilized a combination of rubber and plastic materials (or a softer rubber and a much harder, stiffer rubber) to provide similar performance at lower cost. Such seals have been able to provide an extended life at a relatively low cost, and in some cases, the anticipated lifetime matches the life of the products being sealed, and in other cases, such seals last for a relatively extended time in relation to prior art products.

In assessing the need for a "lifetime" seal, account must be taken not only of the cost of the seal, but also the cost of the mechanism to be protected. Consequently, it is now common for expensive "lifetime" seals to be used on relatively expensive parts such as the final drives in construction machinery, and in some track roller applications. The low cost of non-metal seals of the type just described has enabled them to be adopted for applications wherein the cost of the sealed parts is much less. Applications typically include track pins, for example.

One form of seal that has proven successful is shown and described in U.S. Pat. No. 4,094,516. In this seal, a combination of radial compressive stiffness and proper lubricating action is provided by forming a serrated or ribbed surface on the inner surface of the axial flange of the primary seal ring. A rubber element having a generally frustoconical or modified frustoconical shape is used to apply the radial compressive load necessary to achieve secondary sealing, the necessary torque transmission, and the axial end face load.

The primary seal ring is made from a stiff but resilient, abrasion-resistant plastic or rubber material such as a urethane polymer or the like. While seals of this type have been characterized by significant advantages including excellent performance in relation to cost, it has been discovered that they are capable of further improvement. In this connection, inasmuch as the primary seal is made between a seal band on a hard plastic or hard rubber material on the one hand and the end face of a metal part such as a bushing or spacer, it has been found that a highly effective seal band is formed only after a measurable "wear-in" or "bedding-in" period. In prior art metal bilateral seals, the "bedded-in" finish was achieved by lapping the end faces of the individual parts at the factory before assembly, and hence, no break-in was needed.

In some applications, grit that is intended to be excluded interferes with the ability of the opposed end face surfaces of the plastic and metal elements to achieve this bedding-in action. When a proper seal band is not formed in use, the seal can rapidly become ineffective, resulting in loss of lubricant and in some extreme cases, serious wear within the assembly intended to be sealed.

In view of these circumstances, there is a need for a seal which will retain the simplicity and low cost of prior art seals using a combination of rubber and plastic/rubber materials for forming an end face seal with an opposed metal element, but which would be more reliable upon initial installation, and would not suffer from occasional early failure or "infant mortality." In this connection, while early failure is still relatively rare, manufacturers are seeking reliability approaching 100%.

In view of the failure of the prior art to provide a seal that has the above and other desirable characteristics, it is an object of the invention to provide an improved end face seal.

Another object of the invention is to provide a seal having an auxiliary, abradable excluder lip which functions to protect the seal during its initial period of use.

Yet another object of the invention is to provide a seal of improved initial reliability without substantially increased cost.

A further object of the invention is to provide a seal having a secondary seal ring with an integrally formed, flexible annular projection extending in use both axially and radially outwardly toward the sealed member and radially overlying the leading edge surface of the primary seal ring.

A still further object of the invention is to provide a seal assembly wherein the secondary seal ring provides the still further function of protecting the seal band portion of the primary ring during the initial break-in or wearing-in period.

The foregoing and other objects and advantages of the invention are achieved in practice by providing an annular cross-section primary seal ring of generally L-shape in cross-section with a seal band on the front face of its radial leg and a secondary seal ring having annular secondary seal surfaces respectively engaging a machine counterbore and a seal formed by the rear face of the primary ring radial leg and the radially outer surface of the primary ring axial leg, with the secondary seal ring also including an auxiliary abradable excluder lip preferably in the form of an annular forward extension having a leading edge covering the radially outer surface of the radial leg and also overlying and contacting a part of a second machine element radially outwardly of the primary seal band.

The manner in which the foregoing and other objects and advantages are achieved in practice will become more clearly apparent when reference is made to the following detailed description of the preferred embodiments of the invention set forth by way of example and shown in the accompanying drawings wherein like reference numbers indicate corresponding parts throughout.

DESCRIPTION OF THE PREFERRED EMBODIMENTS OF THE INVENTION

While it is understood that the invention may be constructed in different forms and from somewhat different materials, a brief description will be given of a presently preferred form of seal which is intended for use in heavy duty or severe service environments, such as use on the track rollers or track pins of construction machinery, including track-laying vehicles such as bulldozers, cranes, back hoes, and power shovels, or as components of other mechanisms undergoing rotary or pivoting motion, for example.

Figure 2:
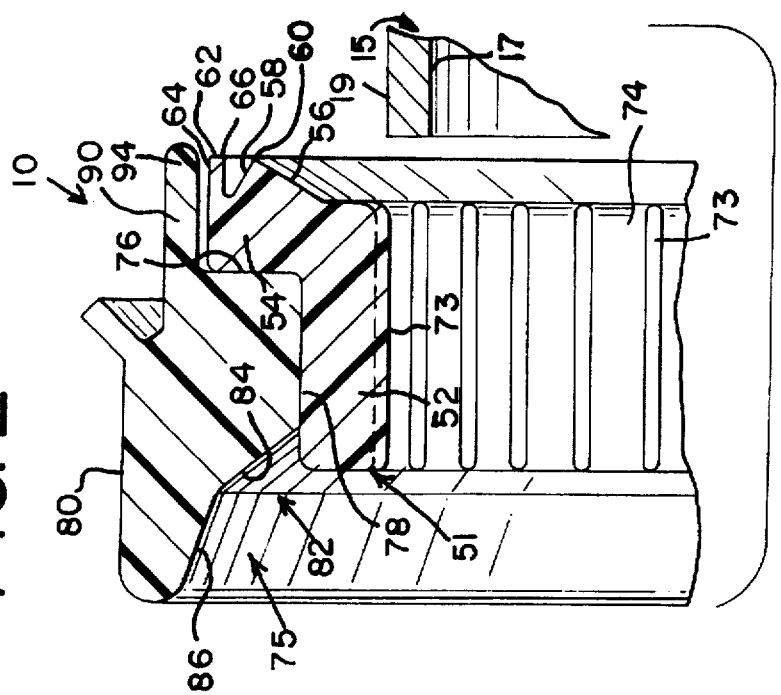
FIG. 2 is an enlarged vertical sectional view of the seal assembly of FIG. 1, shown with the seal parts in their assembled relation but prior to being placed over the spacer and into the application.
Figure 1:
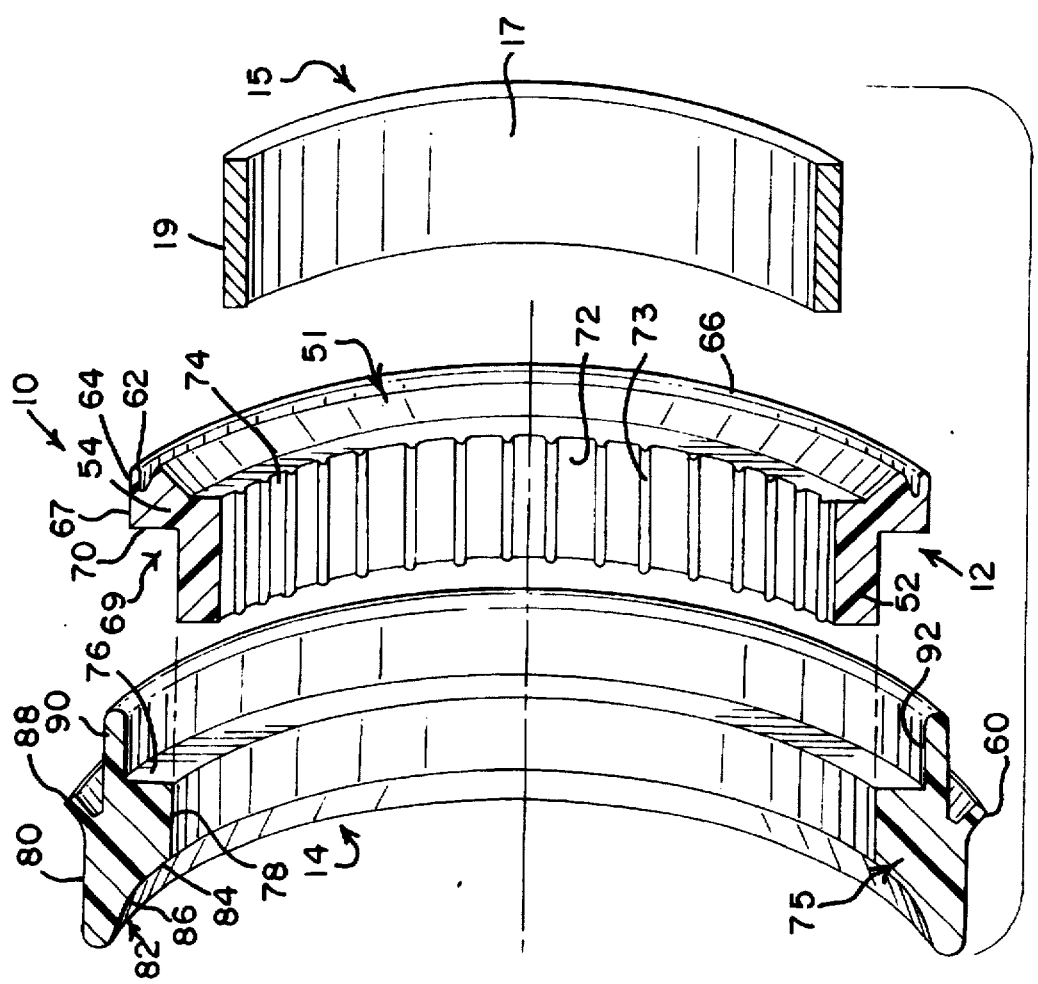
FIG. 1 is an exploded perspective view of the seal assembly of the invention showing the primary seal ring element, the combination load applying and secondary sealing element, and a spacer unit prior to assembly and installation thereof in the application.

Referring now to the drawings in greater detail, FIGS. 1 and 2 show a seal assembly, generally designated 10, made according to the invention. The two main components of the assembly 10 include a primary seal ring generally designated 12 and a combination load and secondary seal ring generally designated 14. Sometimes herein, and in the claims, the expression "load ring" will be used to describe the element 14, it being understood, as will be explained in more detail herein, that such a ring provides a plurality of functions, including a load-applying function, in use.

Figure 3:
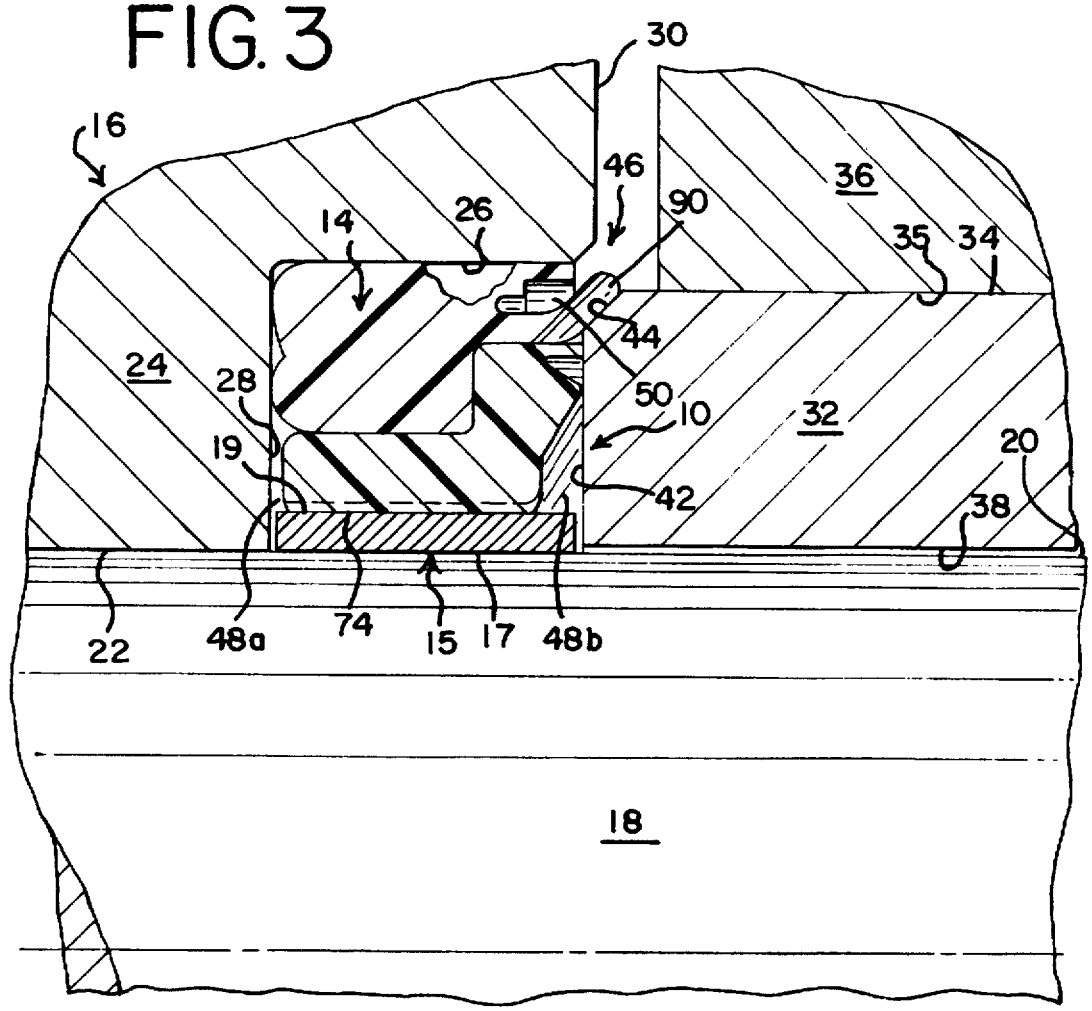
FIG. 3 is a vertical sectional view of the seal assembly of the invention, with portions broken away, and showing the seal in place within a sealed mechanism but before use of the mechanism.
Figure 4:
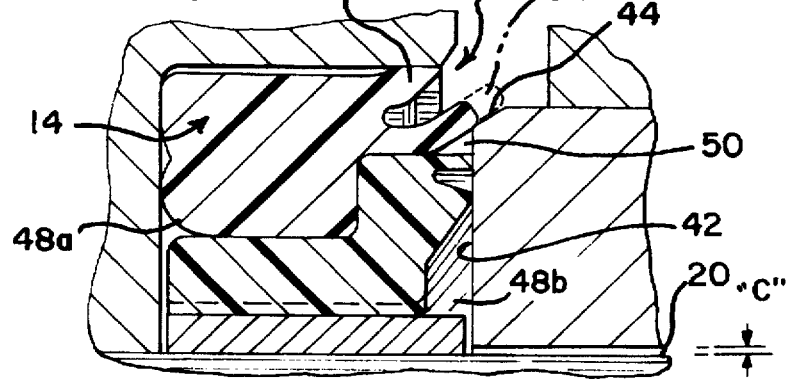
FIG. 4 is a view similar to that of FIG. 3 and showing the seal after at least part of the wearing-in or bedding-in action has taken place during initial use of the seal.

Referring to FIGS. 3 and 4, it will be noted that a sealed mechanism generally designated 16 serves as the environment for the seal assembly 10 and that this mechanism 16 includes a track pin or track roller shaft 18 having a cylindrical outer diameter surface 20 over which is positioned the inner diameter surface 22 of an end cap or like member 24 in press fit or other fluid-tight relation. The end cap 24 includes a generally cylindrical counterbore surface 26, an annular, radially inner or counterbore end face surface 28 and an annular, radially outer or end cap major end face surface 30.

The sealed mechanism also typically includes a bushing 32 having its outer diameter surface 34 press fit into a cylindrical surface 35 on a support element such as a web 36 or the like, and a spacer generally designated 15 having radially inner and outer cylindrical surfaces 17, 19. The inner cylindrical surface 38 of the bushing 32 is separated from the outer diameter surface 20 of the shaft 18 by working clearance "C" (FIG. 4), which accommodates lubricant and permits relative motion of the parts. If the parts are those such as a track pin, the movement is one of oscillation, whereas if the part 18 is a track roller support shaft or the like, the relative motion is one of rotation about the pin or roller axis.

Referring again to FIGS. 3 and 4, for example, the bushing 32 includes an end face 42 and a chamfered outer corner 44. The various parts just described define a seal receiving pocket generally designated 46 (FIG. 3) which is divided by the seal into a pair of connected inner or sealed regions 48a, 48b and an exterior or exposed region 50 in contact with the conditions exterior to the seal. Such conditions may include the presence of water, sand, and grit of various types.

Referring now to the construction and installation of the seal ring 12 disposed within the region 46, and also referring to FIGS. 1 and 2, the seal ring 12 is shown to have a body generally designated 51 having an axial flange 52, a radial flange 54 defined in part by tapered front surfaces 56, 58 meeting along a circular locus 60 which in use will form a primary seal band when it contacts the end face 42 of the bushing 32 in snug, fluid-tight sealing engagement. The radial flange 54 also preferably, but not necessarily includes an auxiliary seal rib generally designated 62 shown to have a flexible body 64 that includes an end face surface 66 also adapted to contact the end face 42 of the bushing 32.

As shown, the radial flange 54 also has a radially outer, circumferentially extending surface 67. A seat generally designated 69 (FIG. 1) for the load ring 14 is formed in part by an annular, radially extending face surface 70 on the radial flange 54 and in part by a radially outer cylindrical surface 71 on the seal ring axial flange 52. The inner diameter surface 72 of the axial flange 52 is held in spaced apart relation from the outer diameter surface 19 of the spacer generally designated 15, preferably by a plurality of axial ribs 73 that absorb radial compressive load. The spacer 15 keeps the bushing 32 and the end cap 24 apart, and by contacting and supporting the ribs 73, the spacer helps stiffen the flange 52. The ribs 73 transmit the radial load from the ring 14 to the spacer, and also provide axial passages 74 for lubricant to pass between regions 48a and 48b (FIGS. 3 and 4).

Referring now to the load or force-applying and secondary sealing ring generally designated 14, this unit is best shown in FIGS. 1 and 2. The ring 14, which undergoes significant distortion in use, has an elastomeric body generally designated 75 which is shown to include radially and axially extending annular surfaces 76, 78 which in use engage the seat 69 where the counterpart surfaces 70, 71 are formed on the seal ring 12. The ring 14 also includes a counterbore-engaging outer diameter surface 80 and a rearward, inclined free surface generally designated 82 and shown to include an inner, more steeply inclined surface segment 84 and a more gradually inclined outer surface segment 86, each extending radially outwardly and axially inwardly toward the sealed region and away from the seal band portion of the primary seal ring. As used herein, and in the claims, "axially outer" means toward the seal band of the primary seal ring and "axially inner" means away from the seal band 60 or to the left as shown in the drawings.

Figure 5:
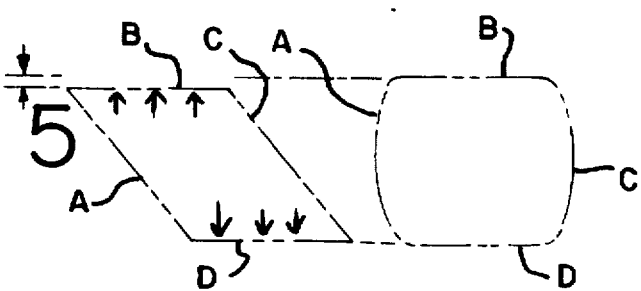
FIG. 5 is a diagrammatic view showing the shapes of the secondary seal ring in its relaxed and compressed conditions, respectively.

By contrasting FIGS. 1 and 2 with FIGS. 3 and 4, it will be noted that, in use, the load ring undergoes axial distortion as it is compressed by the assembly process. This axial shortening of the ring under installation forces causes the ring to expand (or attempt to expand) radially both inwardly relative to its inner diameter and outwardly relative to its outer circumference, thus locking itself with the counterbore and creating a radial compressive load on the seal ring 12. This enables torque to be transmitted from the end cap to the seal ring 12. This development of radial load is illustrated in a simple, schematic manner in FIG. 5, which shows that when there is a substantial flattening or movement towards the vertical flattening a parallelogram shaped ring or "Belleville spring" tends to move its inner and outer diameters away from each other as its cross-section becomes more planar and less frustoconical. In the illustration of FIG. 5, these surfaces are the four sides A, B, C, D of an unstressed parallelogram with a given cross-sectional area. When the Belleville is moved so as to attempt to radially align the surfaces B and D, the elastomeric shape resists by attempting to expand radially and by distorting surfaces A and C such that the cross-section is of greater radial and axial dimension. Resistance to this change of shape generates both axial end face load and radial compressive load. While the shape of the ring 14 is a shape other than a true parallelogram, its behavior is analogous.

Because the elastomeric ring 14 as manufactured (in its unstressed condition) has a slightly smaller outside diameter than that of the counterbore 26, it initially slides freely into the counterbore. Hence, it is desired that the body 51 include a locating or positioning centering barb 88 extending radially outwardly towards the seal band 60. Once the load is applied by axial compression, the ring 14 is snugly retained in the counterbore.

In addition to the foregoing components, the secondary seal and load ring 14 of the invention importantly includes a deformable annular excluder seal body 90 having a deformable inner surface 92 adapted to contact the bushing chamfer 44, with the seal body 90 having a sacrificial end portion 94 (FIG. 4) that will be abraded during the wearing-in period.

According to the invention, the primary seal ring 12 is made from a durable, relatively stiff but resilient material such as a urethane elastomer having a durometer of about 80. Such hard elastomers are capable of making a snug, fluid-tight seal with the machine finished and lubricated end face 42 of the bushing 32 under normal conditions.

However, in order for such a seal to be achieved in practice, a wear-in or bedding-in period is required. This may take as few as about 10 hours up to perhaps 50–200 hours of operation. With mechanical end face seals using hard metals, such as the seals described in U.S. Pat. No. 3,241,583, a satisfactory but very expensive bedding-in or lapping process can be performed on the components before they are assembled. However, with the durable rubber products utilized in the present invention, the two mating surfaces are made by different suppliers and cannot be assembled and bedded-in prior to final installation. Other reasons also rule out such a process.

Experience with severe service seals of the type with which the present invention is concerned has established that the grit to which the seals are exposed can readily penetrate the thin, flexible first excluder lip customarily provided, and enter the interface or seal band area prior to the completion of the bedding-in process. Accordingly, in keeping with the present invention, an annular excluder body is provided which is intended to provide an initial seal on the chamfer or tapered surface 44 of the bushing 32, rather than on its end face 42.

By reason of being made from a relatively softer elastomer that is readily deformed over an outer surface of the bushing, including the bushing chamfer, bevel or even the bushing outer end face, the secondary ring is more compliant than the hard, stiff elastomer of the primary seal ring and the auxiliary seal 62. Hence, while the load ring lacks much of the abrasion resistance of the hard elastomer, it is much more compliant.

Accordingly, it has been shown that initial unreliability caused by premature exposure to grit particles in the seal band area can be virtually eliminated. Because of the difficulty and expense of removing the seals for replacement purposes, reliability and freedom from even occasional "infant mortality" are of crucial importance in many applications, and the present invention provides a seal assembly that is capable of overcoming these difficulties.

Because, as was pointed out, the annular excluder body 90 is made from a relatively soft elastomer, it has a sacrificial character when exposed to significant amounts of grit as are often encountered in use of the sealed mechanism. Thus, as shown in FIG. 4, the end portion of the excluder body 90 is worn off after a few hundred hours or less, but this is of no concern to the overall reliability of the product, because, by such time, the primary seal band has established a grit-tight wear track on the end face of the bushing and such a seal is thereafter reliable for an extended time, such as several thousand hours of operation.

While the presently preferred construction involves an elastomeric annular excluder body that is formed in a cylindrical shape and moves to an inclined position to develop a resistive load while bearing on a taper, bevel or a chamfer formed on the bushing, the principles of the invention may be applied to somewhat different forms of sacrificial excluder body. However, the beveled arrangement discussed, in combination with the deformable body provides a combination of self-centering action and elastomeric load that is highly desirable in use. However, other arrangements may provide for a radial load by an elastomeric secondary seal body radially outwardly of the primary seal band. These sacrificial elements may be used with or without one or more auxiliary seal bands on the primary ring.

It will thus be seen that the present invention provides an improved end face seal with an auxiliary excluder that has a number of advantages and characteristics including those pointed out herein and others which are inherent in the invention. A representative example of the invention having been described in detail by way of example, it is anticipated that various modifications and changes to the forms of invention described herein will occur to those skilled in the art and it is anticipated that such changes and variations may be made without departing from the spirit of the invention and the scope of the appended claims.

I claim:

1. In a sealed mechanism comprising a first machine part with a radially extending end face sealing surface and second, relatively movable machine part with radial and axial annular seal seating surface portions, a heavy duty seal assembly adapted to retain lubricant within a sealed region lying between portions of said mechanism and portions of said seal assembly and to exclude contaminants from said sealed region, said seal assembly comprising, in combination, a primary seal ring and a combination load applying and secondary seal ring associated with said primary seal ring, said primary seal ring having an annular body formed from an abrasion-resistant, stiff but resilient material, and being of generally L-shaped cross section, so as to include radial and axial flanges, said radial flange including at least one axially outer end face with a portion forming a primary seal band on said end face sealing surface of said first machine part and a radially extending, axially inner seating surface, said axial flange having a radially outwardly directed, axially extending cylindrical seating surface, and a radially inwardly directed cylindrical surface disposed in facing relation to one of said machine parts, said secondary sealing ring being made from an elastomer and including a generally radially extending axially outer seating surface in at least partial contact with said axially inner seating surface on said primary seal ring, a cylindrical, radially inwardly directed surface seated on said primary seal ring axial flange, an inclined surface extending radially outwardly and toward one of said second machine part seal seating surfaces and a radially outer cylindrical surface contacting the other of said second machine part seal seating surfaces, said seal assembly further including a flexible, abradable excluder lip extending in use axially outwardly of said secondary seal ring body, and into sealing contact with a portion of said first machine part lying radially outwardly of said primary seal band.

2. A seal assembly as defined in claim 1 wherein said flexible, abradable excluder lip is formed integrally with said combination load applying and secondary seal ring.

3. A seal assembly as defined in claim 2 wherein said flexible abradable excluder lip and said body of said combination load applying and secondary seal ring are formed in a single piece.

4. A seal assembly as defined in claim 1 wherein said combination load applying and secondary seal ring is made from a synthetic elastomer.

5. A seal assembly as defined in claim 1 wherein said primary seal ring is made from a tough, durable synthetic resinous material.

6. A seal assembly as defined in claim 1 wherein said first machine part includes a bushing having a chamfered corner surface, said excluder lip contacting said chamfered corner surface of said bushing.

7. A seal assembly as defined in claim 1 wherein said radially inwardly directed surface of said primary seal ring axial flange includes first portions adapted to engage one of said machine parts and second, circumferentially spaced apart portions forming channels between said seal ring and said one of said machine parts, whereby said primary ring is structurally supported by contact with said one machine part and whereby said channels provide lubricant passages.

8. A seal assembly as defined in claim 1 wherein said radially inwardly directed surface of said primary seal ring axial flange is a serrated surface.

9. A seal assembly as defined in claim 1 wherein said primary seal ring is made from a urethane elastomer.

10. A seal assembly as defined in claim 1 wherein said end face portion forming said end face seal comprises a pair of annular, frusto-conical surfaces meeting at a shallow angle to define a primary seal band area.

11. A heavy duty seal assembly as defined in claim 10 wherein said primary seal ring further includes an auxiliary seal body lying radially outwardly of said seal band, said auxiliary seal having a free end portion extending into contact with a portion of said sealed mechanism just radially outwardly of said seal band.

12. A sealed mechanism comprising, in combination, a generally cylindrical shaft unit, an end cap positioned over said shaft unit in snug, fluid-tight relation, a cylindrical counterbore and a counterbore end face formed in said cap to receive a portion of a seal assembly, a bushing positioned over said shaft and being separated therefrom by a radial working clearance to accommodate lubricant, said bushing having an annular end face surface of intended contact with a seal ring to form a dynamic fluid seal, and a seal assembly positioned within a region defined by said cap counterbore, a primary seal ring and a combination load applying and secondary seal ring associated with said primary seal ring, said primary seal ring having an annular body formed from an abrasion-resistant, stiff but resilient material, and being of generally L-shaped cross section, so as to include radial and axial flanges, said radial flange including at least one axially outer end face with a portion forming a primary seal band on said annular end face surface of said bushing, and a radially extending, axially inner seating surface, said axial flange having a radially outwardly directed, axially extending cylindrical seating surface, and a radially inwardly directed cylindrical surface disposed in facing relation to one of said machine parts, said secondary sealing ring being made from an elastomer and including a generally radially extending axially outer seating surface in at least partial contact with said axially inner seating surface on said primary seal ring, a cylindrical, radially inwardly directed surface seated on said primary seal ring axial flange, an inclined surface extending radially outwardly and toward said counterbore end face and a radially outer cylindrical surface contacting said cylindrical counterbore, said seal assembly further including a flexible, abradable excluder lip extending in use axially outwardly of said secondary seal ring body, and into sealing contact with a portion of said bushing lying radially outwardly of said primary seal band.

* * * * *